United States Patent
Kowase

(10) Patent No.: US 12,278,049 B2
(45) Date of Patent: Apr. 15, 2025

(54) MULTILAYER CERAMIC CAPACITOR, A METHOD OF MANUFACTURING THE SAME AND A SUBSTRATE ARRANGEMENT

(71) Applicant: TAIYO YUDEN CO., LTD., Tokyo (JP)

(72) Inventor: Yusuke Kowase, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 17/687,471

(22) Filed: Mar. 4, 2022

(65) Prior Publication Data

US 2022/0301772 A1 Sep. 22, 2022

(30) Foreign Application Priority Data

Mar. 16, 2021 (JP) .................. 2021-042308

(51) Int. Cl.
| | |
|---|---|
| H01G 4/012 | (2006.01) |
| H01G 4/232 | (2006.01) |
| H01G 4/248 | (2006.01) |
| H01G 4/30 | (2006.01) |

(52) U.S. Cl.
CPC ............. *H01G 4/012* (2013.01); *H01G 4/232* (2013.01); *H01G 4/248* (2013.01); *H01G 4/30* (2013.01)

(58) Field of Classification Search
CPC ........ H01G 4/012; H01G 4/232; H01G 4/248; H01G 4/30
See application file for complete search history.

(56) References Cited

U.S. PATENT DOCUMENTS

| | | | |
|---|---|---|---|
| 10,249,438 B1* | 4/2019 | Byun ................ | H05K 1/11 |
| 2009/0237859 A1 | 9/2009 | Nakamura et al. | |
| 2014/0268488 A1 | 9/2014 | Hattori et al. | |

(Continued)

FOREIGN PATENT DOCUMENTS

| | | |
|---|---|---|
| JP | 2014-199912 A | 10/2014 |
| JP | 2014-212291 A | 11/2014 |

(Continued)

OTHER PUBLICATIONS

Japanese Office Action dated Nov. 19, 2024 in a counterpart Japanese patent application No. 2021-042308. (A machine translation (not reviewed for accuracy) attached.).

(Continued)

*Primary Examiner* — Hoa C Nguyen
*Assistant Examiner* — Amol H Patel
(74) *Attorney, Agent, or Firm* — CHEN YOSHIMURA LLP

(57) ABSTRACT

A multilayer ceramic capacitor includes an element body and a pair of external electrodes. The element body includes a laminate. The laminate has a plurality of inner electrode layers stacked via dielectric layers. A height of the laminate in a stacking direction of the inner electrode layers is greater than a width of each of the inner electrode layers. The two external electrodes are formed on the element body such that one of the two external electrodes is connected to every other ones of the inner electrode layers and the other external electrode is connected to the remaining every other ones of the inner electrode layers.

16 Claims, 14 Drawing Sheets

(56) References Cited

U.S. PATENT DOCUMENTS

| | | | | |
|---|---|---|---|---|
| 2014/0301014 A1* | 10/2014 | Kim | ........................ | H01G 4/30 |
| | | | | 156/89.12 |
| 2014/0311782 A1 | 10/2014 | Lee et al. | | |
| 2015/0287533 A1 | 10/2015 | Lee et al. | | |
| 2019/0385793 A1* | 12/2019 | Wakashima | ......... | H01G 4/2325 |
| 2020/0035417 A1 | 1/2020 | Sakurai et al. | | |
| 2021/0233713 A1* | 7/2021 | Nishimura | ............. | H01G 4/008 |

FOREIGN PATENT DOCUMENTS

| | | | |
|---|---|---|---|
| JP | 2015-201612 A | 11/2015 | |
| JP | 2020-021930 A | 2/2020 | |
| JP | 6816817 B2 | 1/2021 | |
| WO | 2008/072448 A1 | 6/2008 | |

OTHER PUBLICATIONS

Japanese Office Action dated Feb. 18, 2025 in a counterpart Japanese patent application No. 2021-042308. (A machine translation (not reviewed for accuracy) attached.).

* cited by examiner

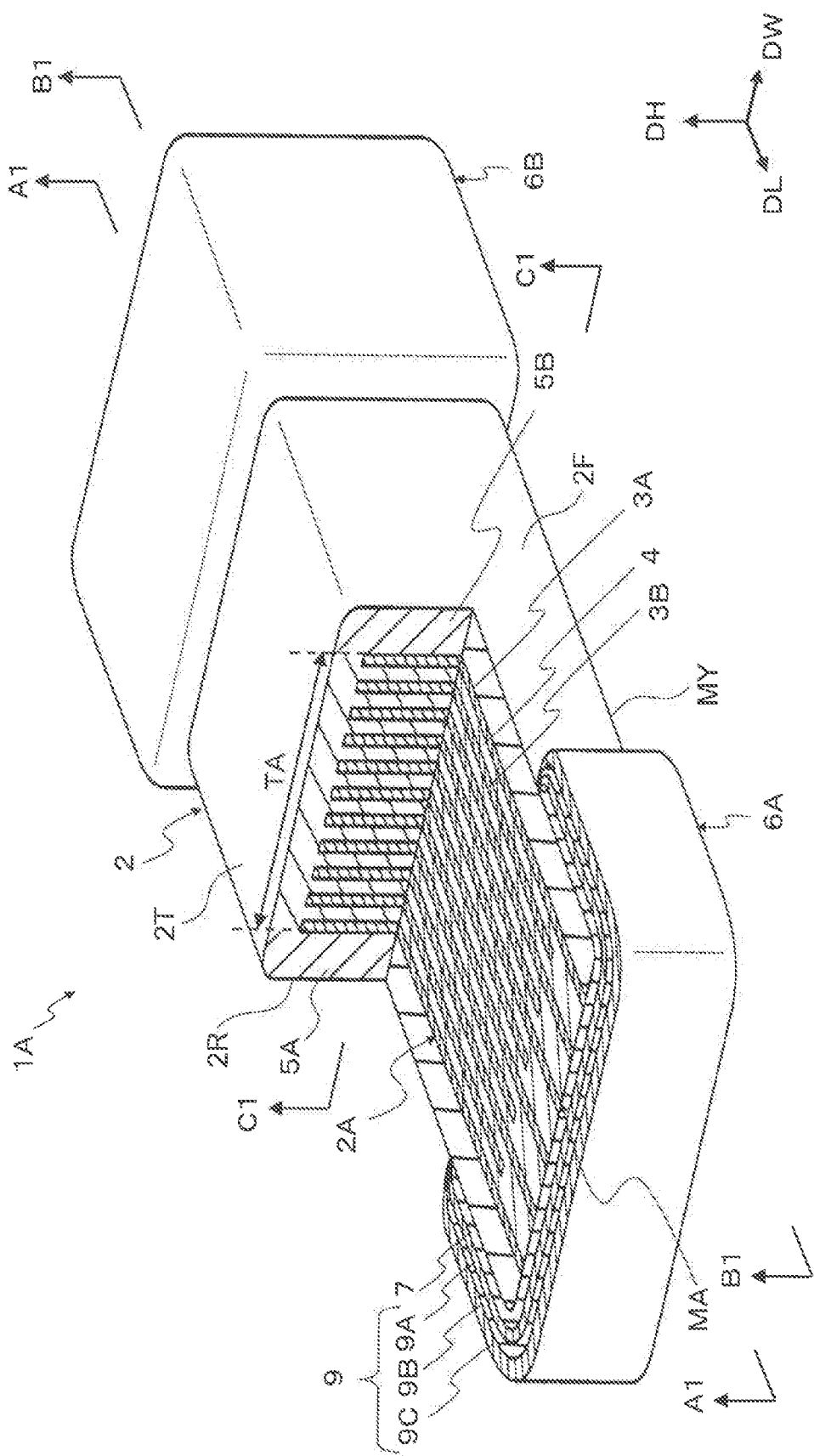

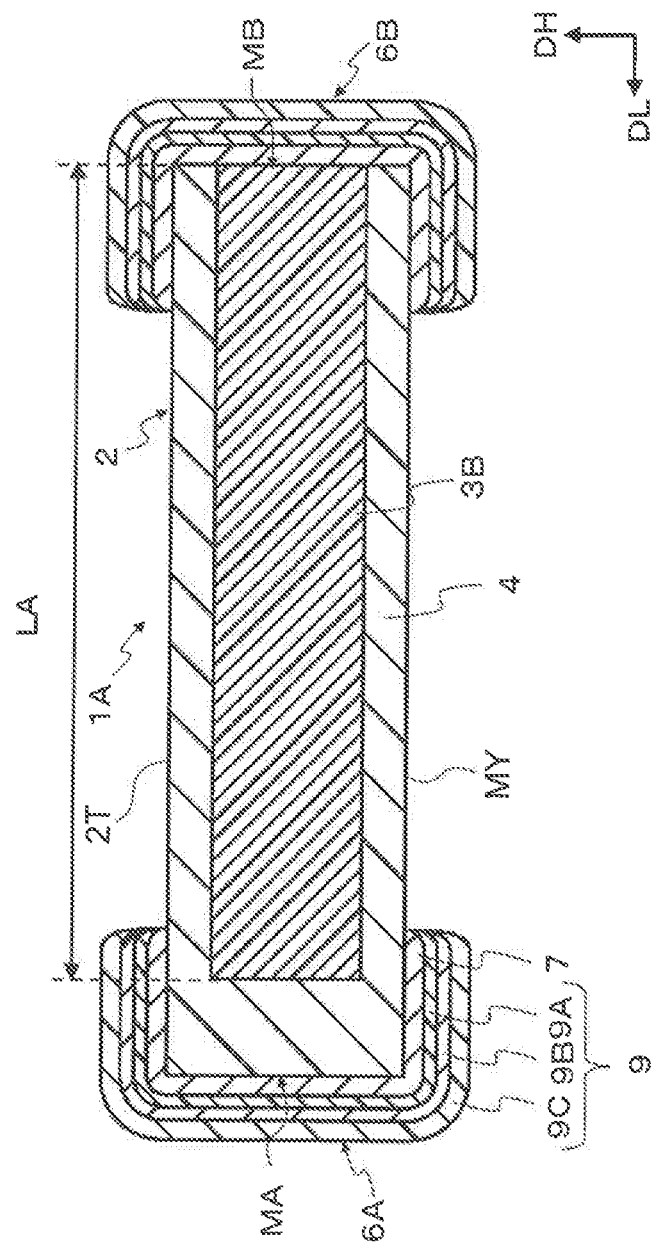

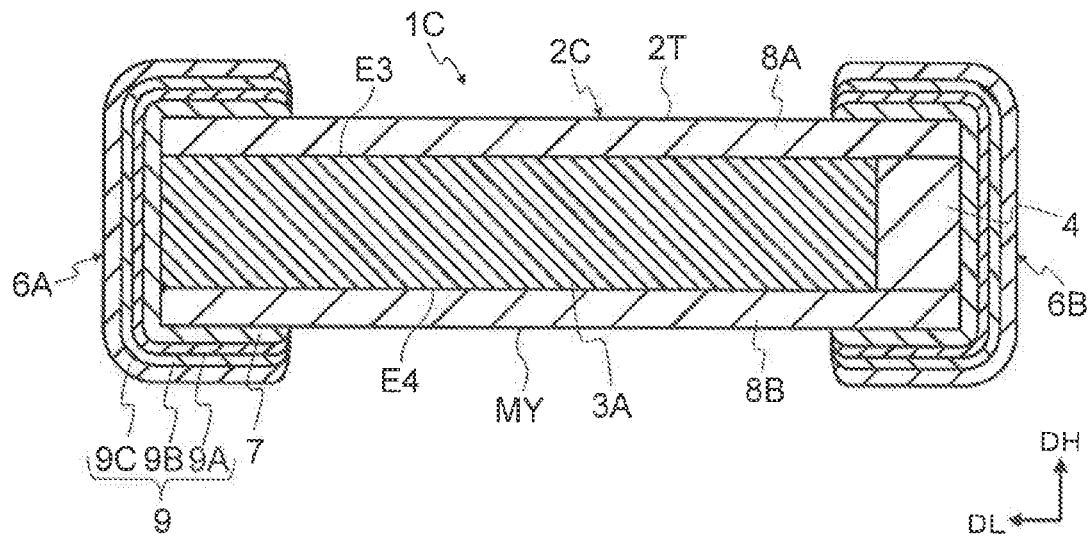
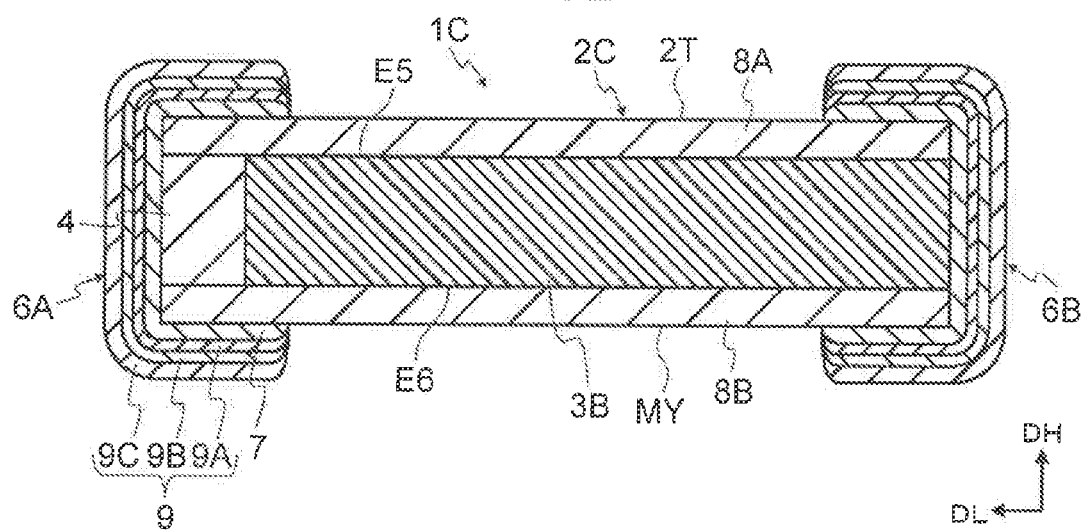
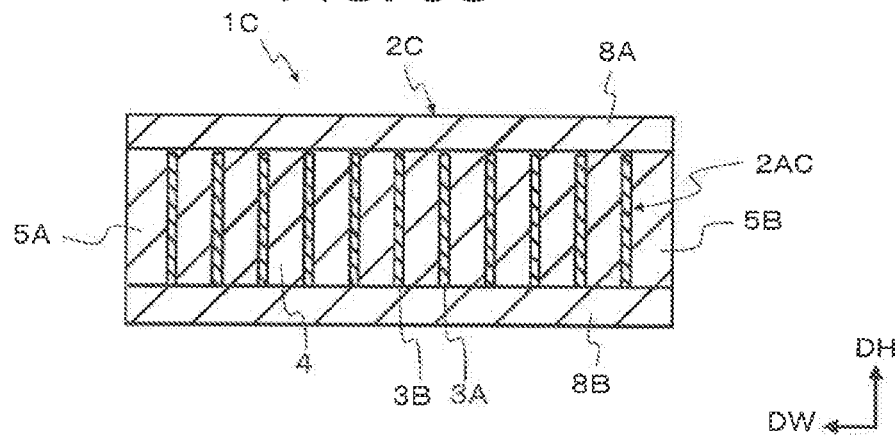

FIG. 10

| | STACKING DIRECTION | SIZE L (μm) | SIZE W (μm) | SIZE T (μm) | DIELECTRIC AVERAGE THICKNESS (μm) | INNER ELECTRODE AVERAGE THICKNESS (μm) | INNER ELECTRODE THICKNESS CENTER PORTION (μm) | INNER ELECTRODE THICKNESS END PORTION (μm) | # OF STACKING | CAPACITANCE (μF) | CAPACITANCE DENSITY (μF/mm3) | EVALUATION TO CAPACITANCE | EVALUATION TO RUPTURE STRENGTH |
|---|---|---|---|---|---|---|---|---|---|---|---|---|---|
| COMPARATIVE EXAMPLE 1 | CONVENTIONAL MANUFACTURING METHOD | 1000 | 500 | 500 | 0.50 | 0.50 | 0.49 | 0.51 | 450 | 19.8 | 98.5 | GOOD | GOOD |
| COMPARATIVE EXAMPLE 2 | CONVENTIONAL MANUFACTURING METHOD | 1000 | 500 | 200 | 0.50 | 0.50 | 0.49 | 0.51 | 150 | 5.9 | 84.4 | NG | GOOD |
| COMPARATIVE EXAMPLE 3 | CONVENTIONAL MANUFACTURING METHOD | 1000 | 500 | 100 | 0.50 | 0.50 | 0.49 | 0.51 | 90 | 1.2 | 45.0 | NG | NG |
| EXAMPLE 1 | UPRIGHT | 1000 | 500 | 500 | 0.50 | 0.50 | 0.49 | 0.51 | 450 | 19.5 | 97.0 | GOOD | GOOD |
| EXAMPLE 2 | UPRIGHT | 1000 | 500 | 200 | 0.50 | 0.50 | 0.55 | 0.43 | 450 | 4.1 | 58.6 | NG | GOOD |
| EXAMPLE 3 | UPRIGHT | 1000 | 500 | 100 | 0.50 | 0.50 | 0.61 | 0.35 | 450 | 0.6 | 22.9 | NG | GOOD |
| EXAMPLE 4 | UPRIGHT | 1000 | 500 | 500 | 0.50 | 0.50 | 0.51 | 0.50 | 450 | 19.6 | 97.5 | GOOD | GOOD |
| EXAMPLE 5 | UPRIGHT | 1000 | 500 | 200 | 0.50 | 0.50 | 0.50 | 0.49 | 450 | 6.5 | 93.0 | GOOD | GOOD |
| EXAMPLE 6 | UPRIGHT | 1000 | 500 | 100 | 0.50 | 0.50 | 0.55 | 0.47 | 450 | 2.4 | 91.5 | GOOD | GOOD |

MULTILAYER CERAMIC CAPACITOR, A METHOD OF MANUFACTURING THE SAME AND A SUBSTRATE ARRANGEMENT

FIELD OF THE INVENTION

The present invention relates to a multilayer ceramic capacitor, a method of manufacturing the multilayer ceramic capacitor and a substrate arrangement.

DESCRIPTION OF THE RELATED ART

As electronic devices become smaller and more sophisticated, a mounting density of electronic components mounted on a mounting board (substrate) is increasing. In order to reduce the electronic components to be mounted on an ordinary mounting surface, on which IC (Integrated Circuit) chips, etc. are mounted, the height of a multilayer ceramic capacitor is reduced and the multilayer ceramic capacitor is mounted on an surface opposite to the ordinary mounting surface of the substrate. This capacitor may be referred to as an LSC (land-side capacitor).

If an element body of the multilayer ceramic capacitor is made thin in order to reduce the height of the multilayer ceramic capacitor, the number of internal electrode layers stacked in the element body is limited to a certain value. This becomes an obstacle to the increasing of capacitance of the capacitor. Japanese Patent No. 6816817 discloses a multilayer ceramic capacitor in which a plurality of internal electrodes vertically stand on a mounting substrate and arranged in a width direction (horizontal direction) of the mounting substrate. JP-A-2015-201612 discloses another multilayer ceramic capacitor that has a similar structure to Japanese Patent No. 6816817. In this specification, the internal electrodes arranged in the horizontal direction may be referred to as "internal electrodes stacked in the horizontal direction."

SUMMARY OF THE INVENTION

If the internal electrodes are stacked in the horizontal direction of the mounting substrate and the multilayer ceramic capacitor has a small height (small vertical size), the height of each of the internal electrodes becomes small, and this results in a decrease in capacitance of the capacitor.

Therefore, it is an objective of the present invention to provide a multilayer ceramic capacitor capable of increasing the number of stacked internal electrodes while reducing the height of the multilayer ceramic capacitor. Another objective of the present invention is to provide a method of manufacturing such multilayer ceramic capacitor. Another objective of the present invention is to provide a substrate arrangement that has such multilayer ceramic capacitor mounted on a substrate.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic capacitor that includes an element body and a pair of external electrode. The element body includes a laminate. The laminate has a plurality of inner electrode layers stacked via dielectric layers. A height of the laminate in a stacking direction of the inner electrode layers is greater than a width of each of the inner electrode layers. The two external electrodes are formed on the element body such that one of the two external electrodes is connected to every other ones of the inner electrode layers and the other external electrode is connected to the remaining every other ones of the inner electrode layers.

In each of the inner electrode layers, a length of the inner electrode layer may be greater than the width of the inner electrode layer.

In each of the inner electrode layers, the length of the inner electrode layer may be greater than twice the width of the inner electrode layer.

The length of each of the inner electrode layers may be greater than the height of the laminate.

A thickness of a width-direction end portion of each of the inner electrode layers may be in a range from 85% to 115% of a thickness of a central portion of each of the inner electrode layers.

An average value of a thickness of each of the inner electrode layers may be 1 µm or less, and the thickness of each of the inner electrode layers may be 0.05 µm or more.

The average value of the thickness of each of the inner electrode layers may be 0.5 µm or less.

The width of each of the inner electrode layers may be between 30 µm and 500 µm.

The width of each of the inner electrode layers may be between 30 µm and 200 µm.

Each of the inner electrode layers may be a deposited film.

Each of the dielectric layers may be a sintered body of a coating film containing a ceramic component.

The element body may have a plurality of faces including a pair of opposing end faces and four faces that are perpendicular to the end faces. The inner electrode layers may include first inner electrode layers and second inner electrode layers such that the first and second inner electrode layers are alternately stacked and such that the first inner electrode layers are exposed at one of the end faces and the second inner electrode layers are exposed at the other of the end faces. One of the two external electrodes may be formed on the above-mentioned one of the end faces and may extend therefrom onto neighboring areas of the four faces of the element body. The other of the two external electrodes may be formed on the other of the end faces and may extend therefrom onto neighboring areas of the four faces of the element body.

The element body may have a plurality of faces including a pair of opposing end faces and four faces that are perpendicular to the end faces. The inner electrode layers may include first inner electrode layers and second inner electrode layers such that the first inner electrode layers are exposed at one of the end faces and the second inner electrode layers are exposed at the other of the end faces. One of the two external electrodes may be formed on the above-mentioned one of the end faces and may extend therefrom onto neighboring areas of only three among the four faces of the element body. The other external electrode may be formed on the other of the end faces and may extend therefrom onto neighboring areas of only the three among the four faces of the element body.

The element body may have a plurality of faces including a pair of opposing end faces and four faces that are perpendicular to the end faces. The two external electrodes may be formed on only one of the four faces of the element body.

The inner electrode layers may be exposed at one of the four faces of the element body. The two external electrodes may be spaced apart from each other on the above-mentioned one of the four faces.

The inner electrode layers may include first inner electrode layers and second inner electrode layers such that the first and second inner electrode layers are alternately stacked. Portions of the first inner electrode layers exposed at the above-mentioned one of the four faces may be spaced from portions of the second inner electrode layers exposed at the above-mentioned one of the four faces in a length direction of the inner electrode layers.

In another aspect of the invention, the present disclosure provides a device that includes a mounting substrate and the above-described multilayer ceramic capacitor. The multilayer ceramic capacitor is mounted on the mounting substrate via at least one solder layer. The inner electrode layers of the multilayer ceramic capacitor are stacked in a horizontal direction along the mounting substrate.

In still another aspect of the invention, the present disclosure provides a method of manufacturing a multilayer ceramic capacitor. The method includes stacking a plurality of inner electrode layers via dielectric layers to form an element body. A height of each of the stacked inner electrode layers is greater than a width of each of the inner electrode layers. The element body has a plurality of faces including at least one end face such that at least one of the inner electrode layers is exposed at the respective end face. The method also includes forming an external electrode on the respective end face of the element body in which the inner electrode layers are exposed.

Each of the inner electrode layers may be a deposition film containing no ceramic component.

According to an aspect of the present invention, it is possible to reduce the height of the multilayer ceramic capacitor and increase the number of stacked internal electrodes in the capacitor.

It is to be understood that both the foregoing general description and the following detailed description are exemplary and explanatory, and are intended to provide further explanation of the invention as claimed.

BRIEF DESCRIPTION OF THE DRAWINGS

FIG. 1 is a perspective view showing a configuration example of a multilayer ceramic capacitor according to a first embodiment of the present invention.

FIG. 2B is a cross-sectional view of the multilayer ceramic capacitor of FIG. 1 taken along the line B1-B1 of FIG. 1.

FIG. 8A is a cross-sectional view of a multilayer ceramic capacitor according to a fourth embodiment of the present invention, taken along the length direction of the multilayer ceramic capacitor.

FIG. 8B is another cross-sectional view of the multilayer ceramic capacitor according to the fourth embodiment, taken along the length direction of the multilayer ceramic capacitor at a different position from FIG. 8A.

FIG. 8C is a cross-sectional view of the multilayer ceramic capacitor according to the fourth embodiment, taken in the width direction of the multilayer ceramic capacitor.

FIG. 10 is a table that shows various values of actual examples of the multilayer ceramic capacitor of FIG. 1 in comparison with comparative examples.

DETAILED DESCRIPTION OF THE EMBODIMENTS

Embodiments of the present invention will be described in detail with reference to the accompanying drawings. The following embodiments do not limit the scope of the invention. Not all combinations of features described in the embodiments may be essential to the invention. The embodiments may be modified or changed depending on the specifications of the device to which the invention is applied and various conditions (usage conditions, usage environment, etc.). The technical scope of the present invention is defined by the claims and is not limited by the following individual embodiments. The drawings used conjunction with the following description may differ in scale and shape from the actual structure in order to make each configuration easier to understand.

First Embodiment

Figure 2A:
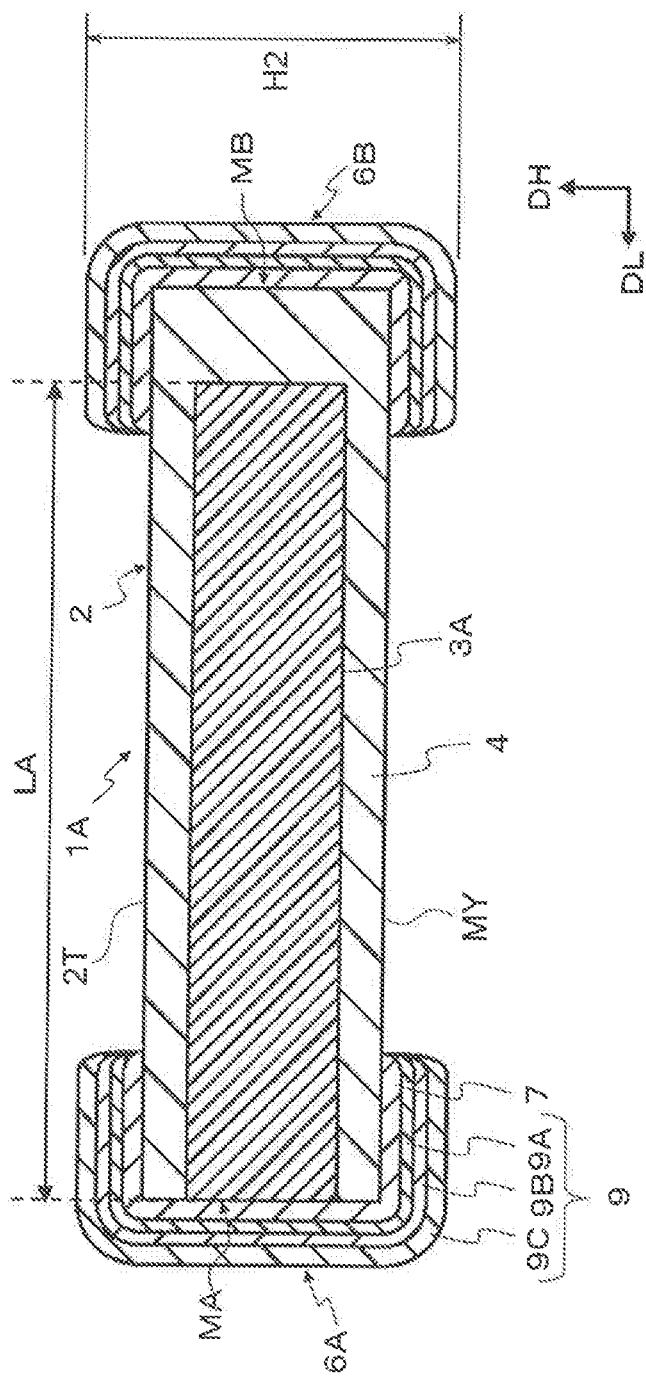
FIG. 2A is a cross-sectional view of the multilayer ceramic capacitor of FIG. 1 taken along the line A1-A1 of FIG. 1.
Figure 2C:
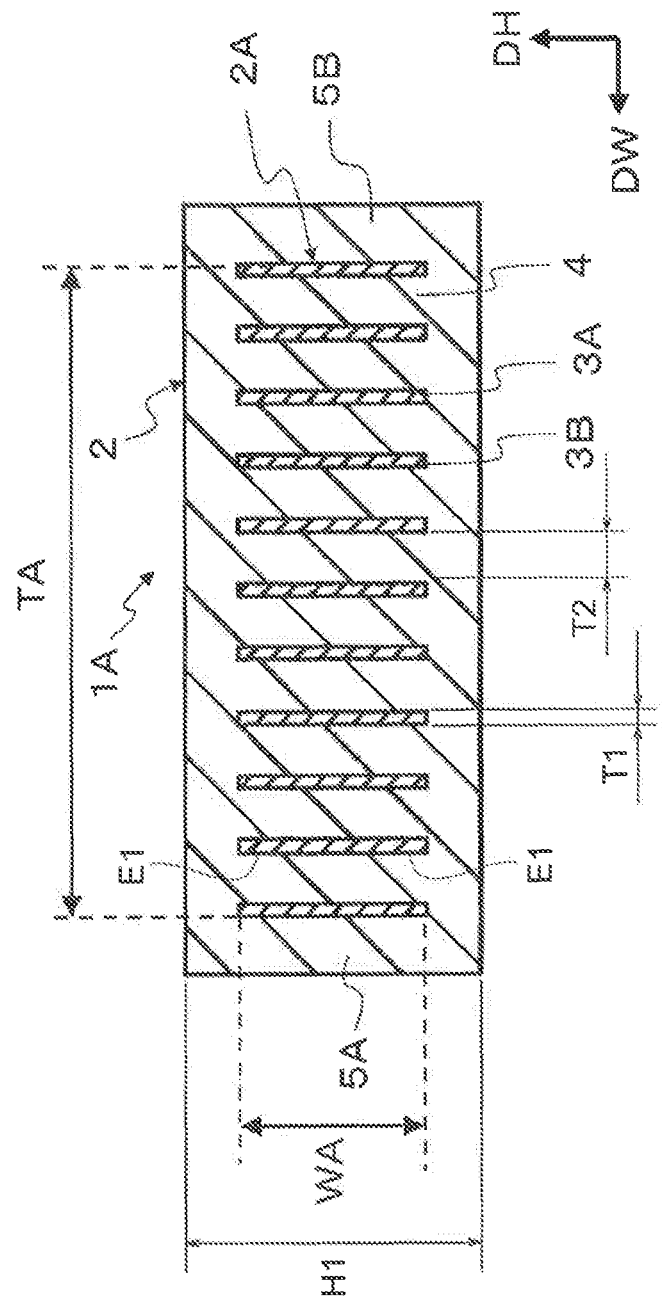
FIG. 2C is a cross-sectional view of the multilayer ceramic capacitor of FIG. 1 taken along the line C1-C1 of FIG. 1.
Figure 2D:
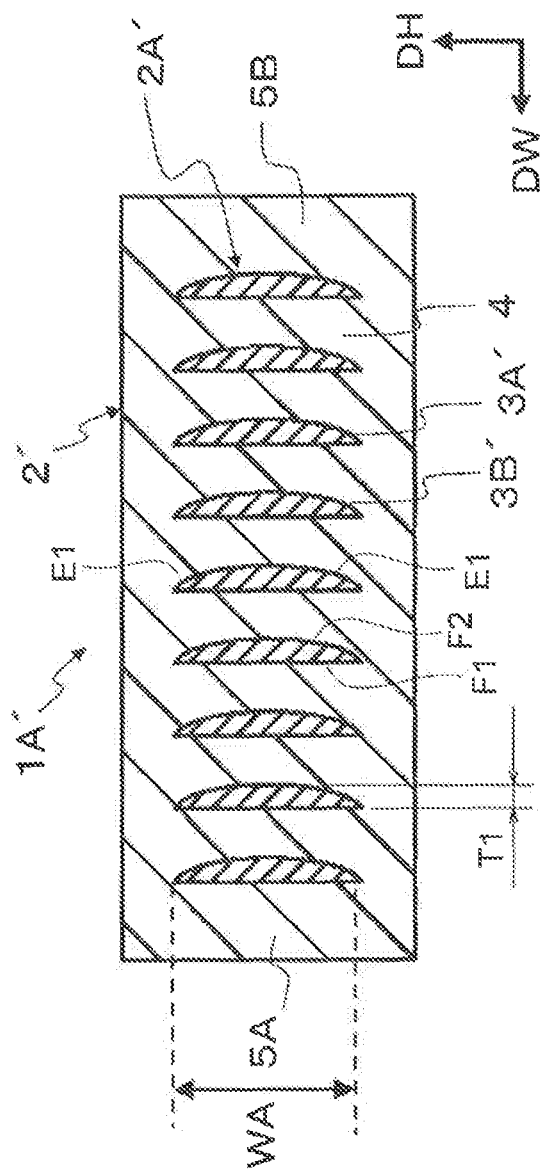
FIG. 2D is similar to FIG. 2C and shows a cross-sectional view of a comparative example, taken in the width direction at the position of an element body of the comparative example.

FIG. 1 is a perspective view showing an exemplary configuration of a multilayer ceramic capacitor 1A according to a first embodiment of the present invention. The multilayer ceramic capacitor 1A has an element body 2. A plurality of first inner electrode layers (first internal electrode layers) 3A and a plurality of second inner electrode layers (second internal electrode layers) 3B are provided in the element body 2. In this specification, a longitudinal direction of the element body 2 is designated by DL and may be referred to as the length direction DL. A width direction of the element body 2 is designated by DW. The first and second inner electrode layers 3A and 3B are alternately arranged, with dielectric layers 4 being interposed, in the width direction DW. It can be said that the inner electrode layers 3A and 3B are "stacked in the width direction DW of the element body 2." Thus, the width direction DW of the element body 2 may be referred to as a stacking direction of the inner electrode layers 3A and 3B. A height direction of the element body 2 is designated by DH. The height direction DH may be referred to as a thickness direction of the element body 2. The height direction DH of the element body 2 may also be referred to as a width direction of each of the inner electrode layers 3A and 3B. FIG. 2A is a cross-sectional view of the multilayer ceramic capacitor 1A of FIG. 1, taken in the length direction DL at the position of one of the first inner electrode layers 3A. FIG. 2B is a cross-sectional view of the multilayer ceramic capacitor 1A, taken in the length direction DL at the position of one of the second inner electrode layers 3B. FIG. 2C is a cross-sectional view of the multilayer ceramic capacitor 1A, taken in the width direction DW at the position of the element body 2. In FIG. 2C, WA denotes the size of each of the internal electrode layers 3A and 3B. The size WA may be referred to as a width of the internal electrode layer 3A, 3B. FIG. 2D shows a comparative example in which each of the inner electrodes is dome-shaped. FIG. 2D is a cross-sectional view of the comparative example, taken in the width direction at the position of an element body of the comparative example.

As shown in FIG. 1 and FIGS. 2A-2C, the multilayer ceramic capacitor 1A includes the element body 2 and two external electrodes (outer electrodes) 6A and 6B. The element body 2 includes a laminate 2A and two covering layers 5A and 5B. The element body 2 has six faces, i.e., a left end face MA, a right end face MB, a front face 2F, a rear face 2R, a top face 2T and a bottom face MY. The left end face MA and the right end face MB are opposite end faces of the element body 2. The laminate 2A includes the inner electrode layers 3A and 3B and the dielectric layers 4. The cover layers 5A and 5B sandwich the laminate 2A in the stacking direction of the inner electrode layers 3A and 3B. In FIG. 1 and FIG. 2C, the size of the laminate 2A in this stacking direction DW is denoted by TA, which may be referred to as a stacking height of the laminate 2A.

Left ends of the internal electrode layers 3A are exposed in the left end face MA of the element body 2 and right ends of the internal electrode layers 3B are exposed in the right end face MB of the element body 2. It should be noted that although FIGS. 1 and 2A-2C show a configuration in which the internal electrode layers 3A and 3B are stacked by eleven layers in total, the number of stacked internal electrode layers 3A and 3B is limited to eleven.

The direction perpendicular to the end face MA of the element body 2 is the length direction DL of the element body 2. The inner electrode layers 3A and 3B are laminated in the width direction DW. The element body 2 may be chamfered along ridgelines of the element body 2.

The multilayer ceramic capacitor 1A may be mounted on a mounting substrate 41 (FIG. 9) and may be used to remove noises applied to semiconductor chips (not shown in FIG. 9) that are mounted on the mounting substrate 41. The front face 2F and the rear face 2R of the element body 2 may be referred to as a pair of lateral faces.

The external electrodes 6A and 6B are formed on the element body 2 such that the external electrodes 6A and 6B are separated from each other in the length direction DL and situated at opposite ends of the element body 2 in the length direction DL. The external electrode 6A may be formed on the left end face MA of the element body 2 and extend to neighboring areas on the front face 2F, the top face 2T, the rear face 2R and the bottom face MY of the element body 2. The external electrode 6B may be formed on the right end face MB of the element body 2 and extend to neighboring areas on the front face 2F, the top face 2T, the rear face 2R and the bottom face MY of the element body 2.

The inner electrode layers 3A and 3B are alternately laminated in the width direction DW of the element body 2 via the dielectric layers 4. In the element body 2, the respective inner electrode layers 3A and 3B stand upright in the height direction DH of the element body 2. In the longitudinal direction DL, the inner electrode layers 3A and 3B are shifted relative to each other in the laminate 2A. Specifically, when compared to the internal electrode layers 3B, the internal electrode layers 3A are arranged on the left side of the element body 2, i.e., the internal electrode layers 3A extend in the length direction DL from the left end face MA of the element body toward the right end face MB. The internal electrode layers 3B are arranged on the right side of the element body 2, i.e., the internal electrode layer 3B extend in the length direction DL from the right end face MB toward the left end face MA. The left end of each of the internal electrode layers 3A is exposed in the left end surface MA of the element body 2 and is connected to the external electrode 6A. The right end of each of the internal electrode layers 3B is exposed in the right end face MB of the element body 2 and is connected to the external electrode 6B.

In the height direction DH of the element body 2, the end portions of the inner electrode layers 3A and 3B are covered with the dielectric layers 4. In the height direction DH of the element body 2, the positions of the end portions of the inner electrode layers 3A 3B may be aligned with each other.

The internal electrode layers 3A and 3B have the same width WA. As shown in FIG. 2C, the stacking height TA of the stack 2A is larger than the width WA of the inner electrode layer 3A, 3B. The stacking direction of the laminate 2A is the width direction DW of the element body 2. The width direction of the respective inner electrode layers 3A, 3B is the height direction DH of the element body 2. By increasing the stacking height TA of the stack 2A, it is possible to increase the number of stacked inner electrode layers 3A and 3B without increasing the height H1 of the element body 2. Therefore, it is possible to increase the capacitance of the multilayer ceramic capacitor 1A while reducing the height H2 of the multilayer ceramic capacitor 1A.

The length direction of the respective inner electrode layers 3A, 3B is the length direction DL of the element body 2. The internal electrode layers 3A and 3B have the same length LA. The length LA of the internal electrode layer 3A, 3B may be larger than the width WA of the internal electrode layer 3A, 3B. The length LA of the internal electrode layer 3A, 3B is preferably larger than twice the width WA of the internal electrode layer 3A, 3B. Thus, it is possible to increase the capacitance of the multilayer ceramic capacitor 1A without increasing the height H1 of the element body 2. The height reduction of the multilayer ceramic capacitor 1A is, therefore, achieved without causing adverse effects.

The length LA of the inner electrode layer 3A, 3B may be larger than the stacking height TA of the stack 2A. Thus, it is possible to increase the capacitance of the multilayer ceramic capacitor 1A without increasing the height H1 of the element body 2. The height reduction of the multilayer ceramic capacitor 1A is, therefore, achieved without causing adverse effects.

The width WA of the inner electrode layer 3A, 3B is preferably between 30 μm and 500 μm, and more preferably between 30 μm and 200 μm. The length LA of the inner electrode layer 3A, 3B is preferably 1000 μm or more. The number of the stacked inner electrode layers 3A and 3B is preferably 450 or more.

In FIG. 2C, the thickness T1 of each of the internal electrode layers 3A and 3B is unchanged in the width direction DH of the internal electrode layer 3A, 3B. It should be noted, however, that the thickness T1 of the internal electrode layer 3A, 3B may change in the width direction DH of the internal electrode layer 3A, 3B. Specifically, the thickness T1 of the internal electrode layer 3A, 3B may be smaller at end portions E1 than at a center portion of the internal electrode layer 3A, 3B. Alternatively, the thickness T1 of the internal electrode layer 3A, 3B may be greater at the end portions E1 than at the center portion of the internal electrode layer 3A, 3B. In this embodiment, the thickness T1 of the end portion E1 of the internal electrode layer 3A, 3B is preferably in the range from 85% to 115% of the thickness of the center portion of the internal electrode layer 3A, 3B. Each of the inner electrode layers 3A and 3B may be a deposited film, such as a sputtered film or a vapor-deposition film. The inner electrode layers 3A and 3B may contain no ceramic components.

A comparative example will be described with reference to FIG. 2D. Each of the inner electrode layers 3A' and 3B' in FIG. 2D may be formed by sintering a coating film containing a metallic powder. The element body that has the inner electrode layers 3A' and 3B' is denoted by 2' in FIG. 2D, and the capacitor that has the element body 2' is denoted by 1A'. The element body 2' of FIG. 2D includes a laminate 2A' instead of the laminate 2A of FIG. 2C. In the laminate 2A', the inner electrode layers 3A' and 3B' are alternately stacked via the dielectric layers 4. When forming the inner electrode layers 3A' and 3B' by means of sintering the coating films, the width WA of each inner electrode layer 3A', 3B' becomes smaller so that each inner electrode layer 3A', 3B' has a dome shape that has a flat surface F1 and an arcuate surface (convex surface) F2. To prevent the deterioration of the insulation between the inner electrode layers 3A' and 3B', the number of stacked inner electrode layers 3A' and 3B' per unit length in the laminate 2A' is reduced as compared with the laminate 2A of FIG. 2C. In addition, the distance between each two adjacent inner electrode layers 3A' and 3B' increases at the end portions E1 of the inner electrode layers 3A' and 3B'. This leads to a decrease in capacitance of the capacitor 1A'.

In the laminate 2A of the first embodiment of the invention, on the other hand, the thickness T1 of the end portion E1 of each inner electrode layer 3A, 3B is in the range from 85% to 115% of the thickness of the central portion of each inner electrode layer 3A, 3B. Therefore, in the laminate 2A of FIG. 2C, it is possible to increase the number of stacked inner electrode layers 3A and 3B per unit length as compared with the laminate 2A' of FIG. 2D, and it is possible to suppress an increase in the distance between the inner electrode layers 3A and 3B at the end portions E1 of the inner electrode layers 3A and 3B. Accordingly, it is possible to suppress a decrease in capacitance of the capacitor 1A.

An average value of the thickness T1 of the inner electrode layers 3A and 3B is preferably 1 μm or less, and the thickness T1 of each inner electrode layer 3A, 3B is preferably 0.05 μm or more. More preferably, the average value of the thickness T1 of the inner electrode layers 3A and 3B is 0.5 μm or less, and the thickness T1 of each inner electrode layer 3A, 3B is 0.05 μm or more.

A main component of the inner electrode layer 3A, 3B may be a metal such as Cu (copper), Fe (iron), Zn (zinc), Al (aluminum), Sn (tin), Ni (nickel), Ti (titanium), Ag (silver), Au (gold), Pt (platinum), Pd (palladium), Ta (tantalum) or W (tungsten), or an alloy containing at least one of these metals.

The thickness T2 of the dielectric layer 4 may be in the range from 0.05 μm to 5 μm. A main component of the material of the dielectric layer 4 may be, for example, a ceramic material having a perovskite structure. The main component may be contained 50 at % or more. The ceramic material of the dielectric layer 4 may be, for example, barium titanate, strontium titanate, calcium titanate, magnesium titanate, barium strontium titanate, barium calcium titanate, calcium zirconate, barium zirconate, calcium zirconate titanate and titanium oxide.

A main component of the material of the cover layer 5A, 5B may be, for example, a ceramic material. The main component of the ceramic material of the cover layer 5A, 5B may be the same as the main component of the ceramic material of the dielectric layer 4.

A main component of the external electrode 6A, 6B is a metal such as Cu, Fe, Zn, Al, Ni, Pt, Pd, Ag, Au or Sn, or an alloy containing at least one of these metals.

Each of the external electrodes 6A and 6B has conductive layers on the two end faces MA and MB. The conductive layers formed on each of the end faces MA and MB are, for example, an underlayer 7 formed on the element body 2 and a plating layer 9 formed on the underlayer 7. The left underlayer 7 is formed on the left end face MA of the element body 2 and the right underlayer 7 is formed on the right end face MB of the element body 2 such that the two underlayers 7 are separated from each other in the longitudinal direction DL of the element body 2. The left underlayer 7 is formed on the left end face MA and extends onto neighboring areas of the top face 2T, the front face 2F, the bottom face MY and the rear face 2R. The right underlayer 7 is formed on the right end face MB and extends onto neighboring areas of the top face 2T, the front face 2F, the bottom face MY and the rear face 2R. The top face 2T, the front face 2F, the bottom face MY and the rear face 2R are four faces that are perpendicular to the end faces MA and MB of the element body 2.

A main component of a metal used as a conductive material of the underlayer 7 may be, for example, Cu, Fe, Zn, Al, Ni, Pt, Pd, Ag, Au or Sn, or an alloy containing at least one of these metals. The base layer (underlayer) 7 may include a co-material in which metals are mixed. The co-material is mixed in the form of a plurality of islands in the underlayer 7 to reduce the difference in the coefficient of thermal expansion between the element body 2 and the underlayer 7 and alleviate a stress applied to the underlayer 7. The co-material is, for example, a ceramic component which is the main component of the dielectric layer 4. The base layer 7 may contain a glass component. If the glass component is mixed in the base layer 7, the glass component can densify the base layer 7. This glass component is, for example, an oxide of Ba (barium), Sr (strontium), Ca (calcium), Zn, Al, Si (silicon) or B (boron).

Each of the base layers 7 is preferably formed of a sintered body of a conductive metal paste. The base layer 7 having this configuration can have a large thickness while ensuring the adhesion between the element body 2 and the base layer 7. As a result, the electrical conduction between the left base layer 7 and the inner electrode layer 3A and between the right base layer 7 and the inner electrode layer 3B is ensured while ensuring the strength of the external electrodes 6A and 6B.

Figure 9:
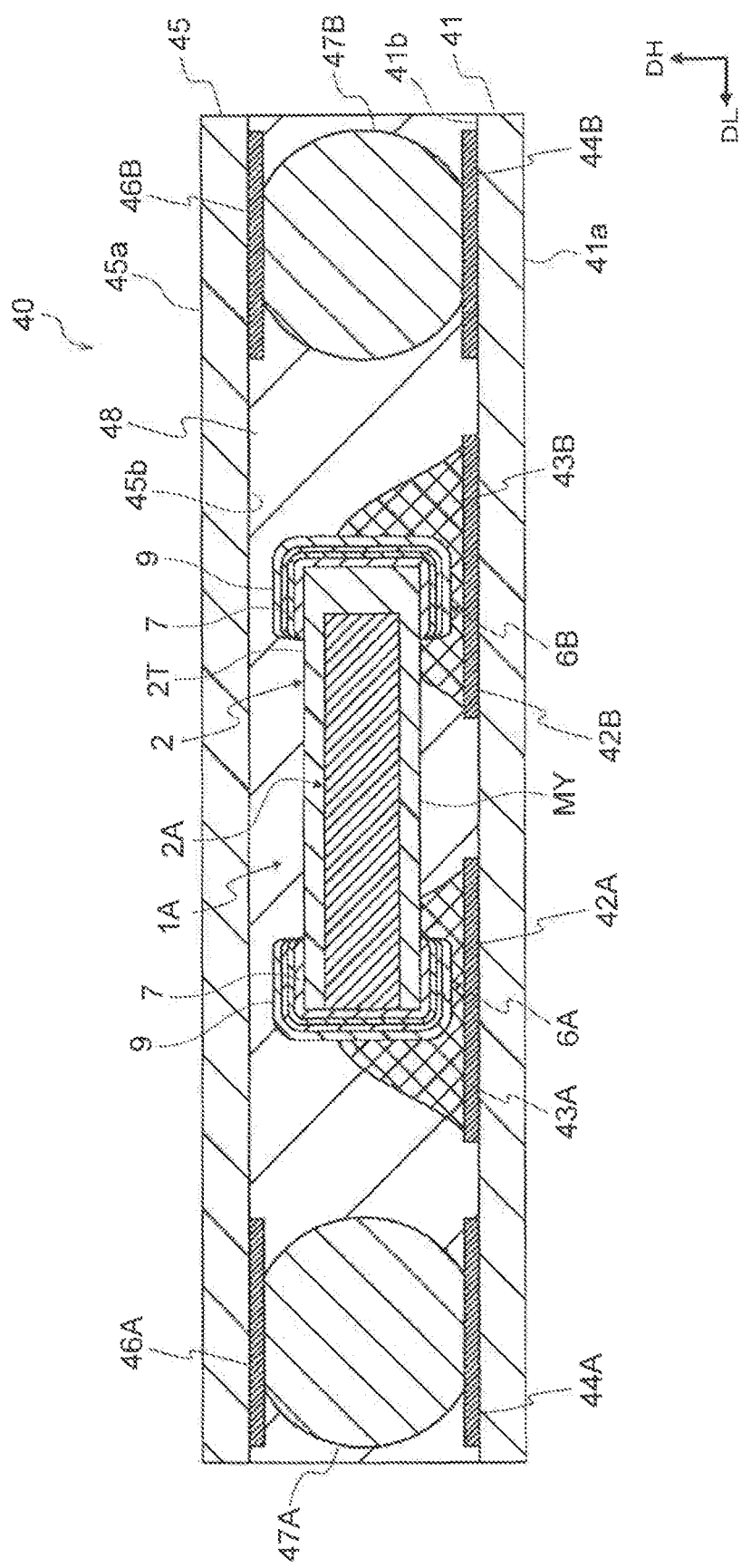
FIG. 9 is a cross-sectional view showing a configuration example of a device according to a fifth embodiment of the present invention, which includes a multilayer ceramic capacitor mounted on a substrate.

The left plating layer 9 is formed over the left base layer 7 of the left external electrode 6A and the right plating layer 9 is formed over the right base layer 7 of the right external electrode 6B. The left plating layer 9 is conductive with the inner electrode layers 3A through the left base layer 7, and the right plating layer 9 is conductive with the inner electrode layers 3B through the right base layer 7. When the capacitor 1A is mounted on the mounting substrate 41 (FIG. 9), the plating layers 9 are electrically connected to terminals 42A and 42B (FIG. 9) of the mounting substrate 41 through solder layers 43A and 43B (FIG. 9).

The material of the plating layer 9 is, for example, a metal such as Cu, Fe, Zn, Al, Ni, Pt, Pd, Ag, Au or Sn or an alloy containing at least one of these metals. The plating layer 9 may have a single-layer structure that includes a single metal component or a multilayer structure that includes a plurality of plating layers of different metal components. The plating layer 9 may have, for example, a three-layer structure, that includes a Cu plating layer 9A formed on the underlayer 7, an Ni plating layer 9B formed on the Cu plating layer 9A, and an Sn plating layer 9C formed on the Ni plating layer 9B. The Cu plating layer 9A can improve the adhesion of the plating layer 9 to the underlayer 7. The Ni plating layer 9B can improve the heat resistance of the external electrode 6A, 6B during soldering. The Sn plating layer 9C can improve the wettability of the solder to the plating layer 9.

Figure 3:
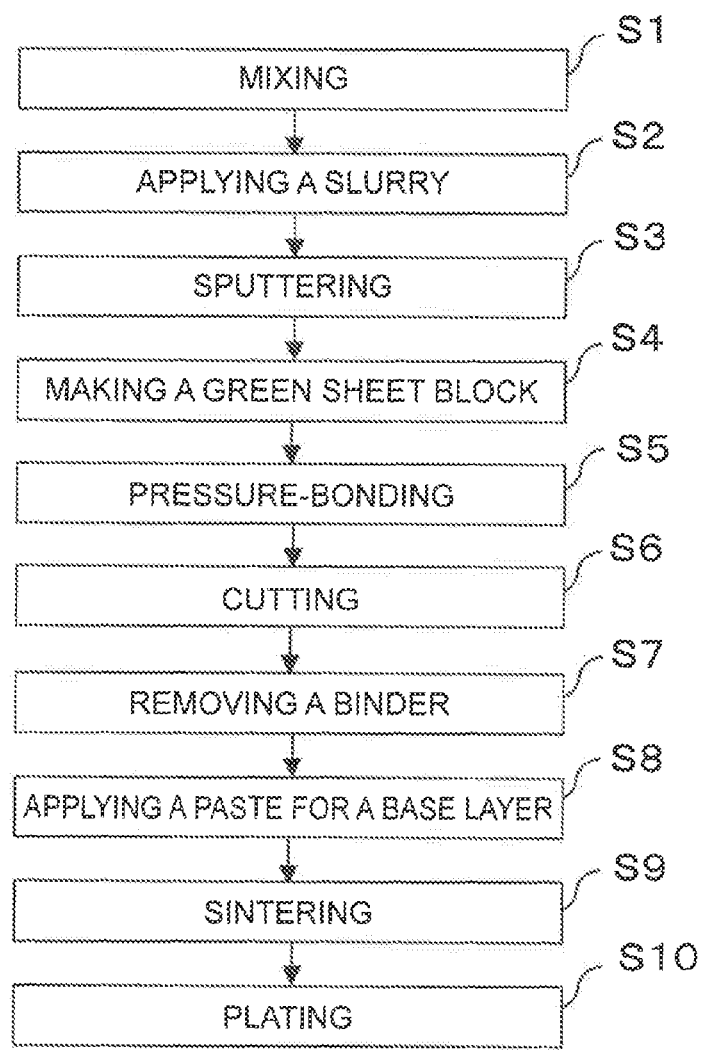
FIG. 3 is a flowchart showing a method of manufacturing the multilayer ceramic capacitor according to the first embodiment.
Figure 4A:
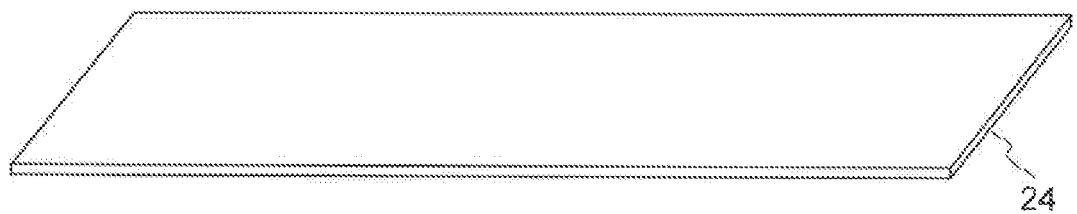
FIG. 4A is a perspective view useful to describe the method of manufacturing the multilayer ceramic capacitor according to the first embodiment.
Figure 4B:
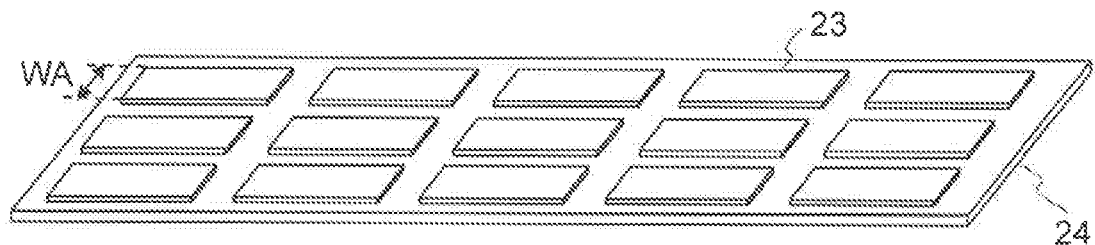
FIG. 4B is another perspective view useful to describe the method of manufacturing the multilayer ceramic capacitor according to the first embodiment.
Figure 4C:
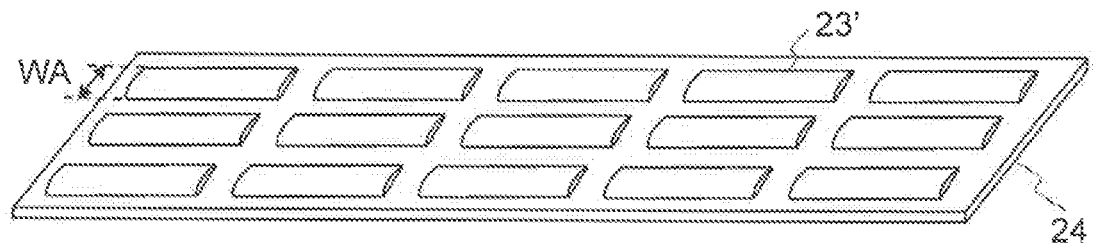
FIG. 4C is a perspective view useful to describe a method of manufacturing the comparative example shown in FIG. 2D.

FIG. 3 is a flowchart showing an exemplary method of manufacturing the multilayer ceramic capacitor 1A according to the first embodiment. FIGS. 4A and 4B are perspective views useful to describe the method of manufacturing the multilayer ceramic capacitor 1A. FIG. 4C is a perspective view showing a method of manufacturing the comparative example shown in FIG. 2D. FIGS. 5A-5H are a series of cross-sectional views showing the method of manufacturing the multilayer ceramic capacitor 1A according to the first embodiment. It should be noted that for the sake of illustration, FIGS. 5H-5C show a configuration in which five inner electrode layers 3A and five inner electrode layers 3B are alternately stacked via the dielectric layers 4.

As indicated in Step S1 of FIG. 3, an organic binder and an organic solvent as a dispersant and a forming aid are added to a dielectric material powder, and pulverized and mixed to produce a slurry. The dielectric material powder includes, for example, a ceramic powder. The dielectric material powder may contain an additive or additives. The additive(s) may be, for example, an oxide of Mg (magnesium), Mn (manganese), V (vanadium), Cr (chromium), Y (yttrium), Sm (samarium), Eu (europium), Gd (cadmium), Tb (terbium), Dy (dysprosium), Ho (holmium), Er (erbium), Tm (thulium), Yb (ytterbium), Co (cobalt), Ni, Li (lithium), B, Na (sodium), K (potassium) or Si, or glass. The organic binder is, for example, polyvinyl butyral resin or polyvinyl acetal resin. The organic solvent is, for example, ethanol or toluene.

Figure 5A:
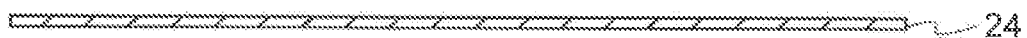
FIG. 5A is a cross-sectional view useful to describe the method of manufacturing the multilayer ceramic capacitor according to the first embodiment.

Next, as indicated in Step S2 of FIG. 3 and shown in FIGS. 4A and 5A, a green sheet 24 is prepared. Specifically, the slurry containing the ceramic powder is applied onto a carrier film in a sheet form and dried to manufacture the green sheet 24. The carrier film is, for example, a PET (polyethylene terephthalate) film. A doctor blade method, a die coater method or a gravure coater method may be used to apply the slurry onto the carrier film. Step S2 is repeated to prepare a plurality of green sheets 24.

Figure 5B:
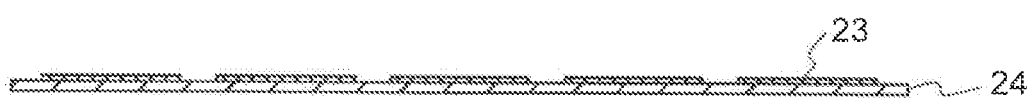
FIG. 5B is another cross-sectional view useful to describe the method of manufacturing the multilayer ceramic capacitor according to the first embodiment.
Figure 5C:
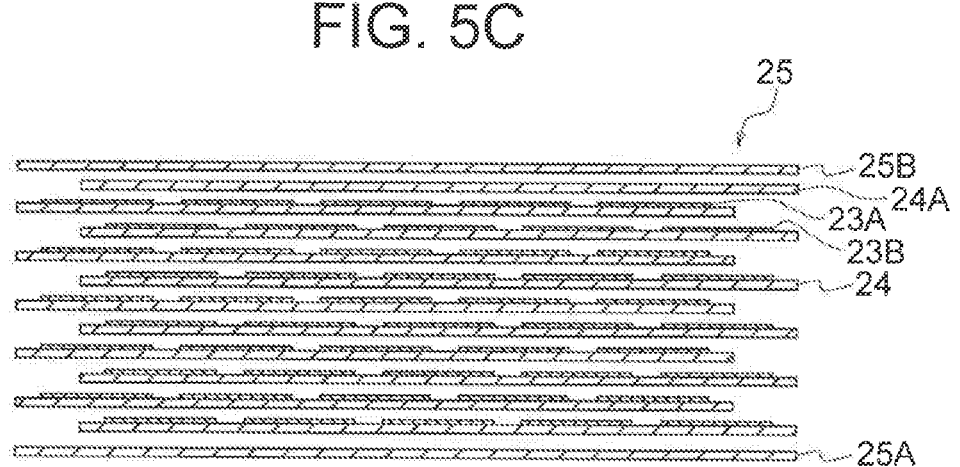
FIG. 5C is still another cross-sectional view useful to describe the method of manufacturing the multilayer ceramic capacitor according to the first embodiment.

Next, as indicated in Step S3 of FIG. 3 and shown in FIGS. 4B and 5B, internal electrode patterns 23 are formed onto each of those green sheets 24, which will form the internal electrode layers 3A and 3B, among the green sheets prepared in Step S1. The internal electrode patterns 23 are formed by sputtering method or vapor deposition. By performing the sputtering or vapor deposition with a metal mask having a plurality of openings corresponding to the internal electrode patterns 23, it is possible to form, on the green sheet 24, the internal electrode patterns 23 that are separated from each other in the longitudinal direction and the width direction of the green sheet 24. In this manner, a plurality of green sheets 24 that have the inner electrode patterns 23 thereon are prepared.

To reduce the height of the multilayer ceramic capacitor 1A, the width WA of each of the inner electrode patterns 23 is set to be short. For example, the width WA of the internal electrode pattern 23 is set to be between 30 μm and 200 μm.

Because the inner electrode patterns 23 are formed by a film forming method such as sputtering or vapor deposition, the thickness T1 of the end portion E1 of the inner electrode layer 3A, 3B can be set within a range from 85% to 115% of the thickness T1 of the central portion of the inner electrode layer 3A, 3B even when the width WA of the inner electrode pattern 23 is small.

Referring now to FIG. 4C, the comparative example will be described. In FIG. 4C, a conductive paste for the inner electrode is applied to the green sheet 24 in a predetermined pattern to form the inner electrode patterns 23', which will become the inner electrode layers 3A' and 3B' shown in FIG. 2D. The internal electrode patterns 23' are formed on a single green sheet 24 such that the internal electrode patterns 23' are separated from each other in the longitudinal direction and the width direction of the green sheet 24. The conductive paste for the internal electrode includes a powder of the metal used as the material of the internal electrode layers 3A' and 3B'. Further, the conductive paste for the internal electrode includes a binder, a solvent, and, if necessary, an auxiliary agent. The conductive paste for the internal electrode may contain, as a co-material, a ceramic material which is the main component of the dielectric layers 4. The application of the conductive paste for the internal electrode may be carried out by a screen printing method, an ink jet printing method or a gravure printing method.

If the conductive paste for the inner electrode is applied to form the inner electrode patterns 23' and the width WA of each of the inner electrode pattern 23' is reduced, then the inner electrode layer 3A', 3B' has a dome shape as shown in FIG. 2D. Therefore, the number of the stacked inner electrode layers 3A' and 3B' per unit length in the laminate 2A' is smaller than the number of the stacked inner electrode layers 3A and 3B per unit length in the laminate 2A shown in FIG. 2C. Also, the distance between each two adjacent inner electrode layers 3A' and 3B' at the end portions E1 becomes longer as compared to the inner electrode layers 3A and 3B. This reduces the capacitance of the capacitor 1A' as compared with the capacitor 1A.

Next, as indicated in Step S4 of FIG. 3 and shown in FIG. 5C, the green sheets 24 on which the internal electrode patterns 23 are formed (FIG. 5B) and the green sheets 24A, 25A and 25B on which the internal electrode patterns 23 are not formed are laminated in a predetermined order to create a block 25 of the green sheets 24. The green sheets 25A and 25B on which the internal electrode patterns 23 are not formed are used as outer layers (i.e., the bottom layer and the top layer). In Step S4, the green sheets 24 having the internal electrode patterns 23 thereon are divided into two groups, i.e., the green sheets 24 having the internal electrode patterns 23A thereon and the green sheets 24 having the internal electrode patterns 23B thereon. Then, the green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24. Further, three types of portions are defined in the green sheet block 25. Specifically, a portion where only the internal electrode patterns 23A are stacked in the stacking direction, a portion where the internal electrode patterns 23A and 23B are stacked alternately in the stacking direction, and a portion where only the internal electrode patterns 23B are stacked in the stacking direction are defined the green sheet block 25.

Figure 5D:
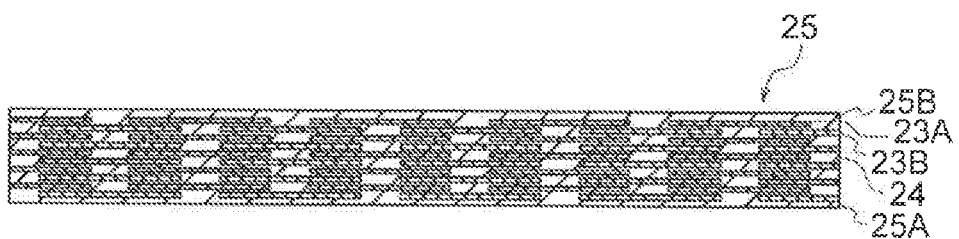
FIG. 5D is yet another cross-sectional view useful to describe the method of manufacturing the multilayer ceramic capacitor according to the first embodiment.

Next, as indicated in Step S5 of FIG. 3 and shown in FIG. 5D, the laminate block 25 obtained in the forming process of Step S4 of FIG. 3 is pressed such that the green sheets 24, 24A, 25A and 25B are pressure-bonded. The laminate block 25 may be pressed by, for example, a hydrostatic press.

Figure 5E:
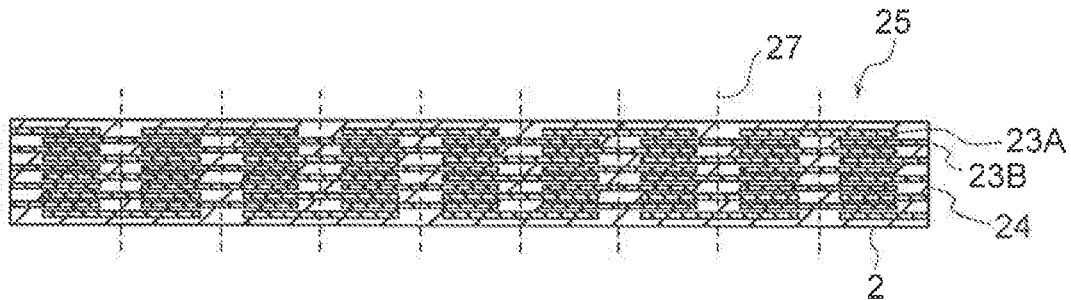
FIG. 5E is another cross-sectional view useful to describe the method of manufacturing the multilayer ceramic capacitor according to the first embodiment.

Next, as indicated in Step S6 of FIG. 3 and shown in FIG. 5E, the pressed laminate block 25 is cut such that the block 25 is separated to a plurality of element bodies 2, each of which has a rectangular parallelepiped shape. Each element body 2 has six surfaces. The cutting of the laminate block 25 is carried out at the portions where only the inner electrode patterns 23A are present in the stacking direction, and the portions where only the inner electrode patterns 23B are present in the stacking direction, as indicated by a plurality of vertical broken lines 27. The cutting of the laminate block 25 is carried out by, for example, blade dicing or a similar method.

Figure 5F:
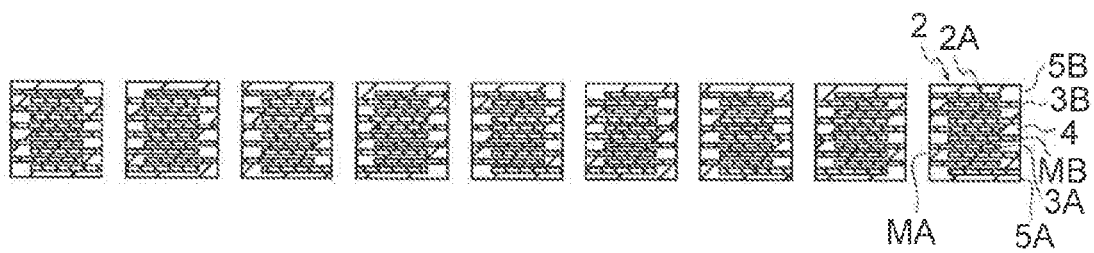
FIG. 5F is another cross-sectional view useful to describe the method of manufacturing the multilayer ceramic capacitor according to the first embodiment.

As shown in FIG. 5F, the internal electrode layers 3A and 3B are alternately laminated via the dielectric layers 4 in each of the individual element bodies 2, with the upper cover layer 5B becoming the top layer and the lower cover layer 5A becoming the bottom layer. The internal electrode layers 3A are exposed on the left face MA of each element body 2, and the internal electrode layers 3B are exposed on the right face MB of each element body 2.

Next, as indicated in Step S7 of FIG. 3, the binder contained in each of the element bodies 2 obtained in Step S6 of FIG. 3 is removed. The removal of the binder is carried out by, for example, heating the element bodies 2 in an $N_2$ atmosphere at about 350 degrees C.

Figure 5G:
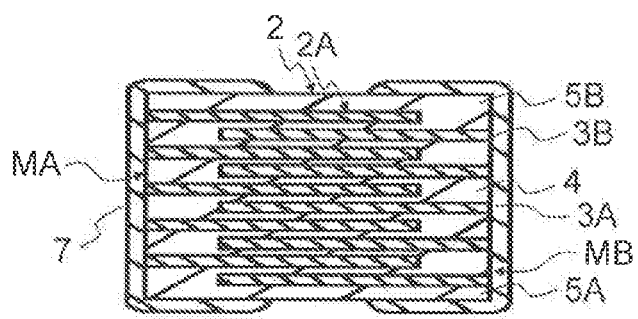
FIG. 5G is another cross-sectional view useful to describe the method of manufacturing the multilayer ceramic capacitor according to the first embodiment.
Figure 5H:
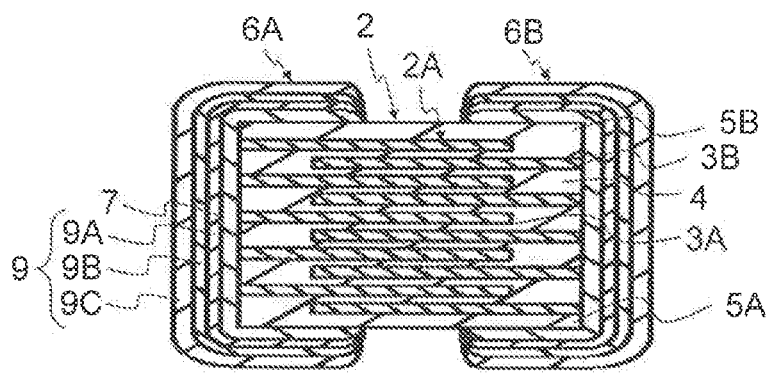
FIG. 5H is another cross-sectional view useful to describe the method of manufacturing the multilayer ceramic capacitor according to the first embodiment.

Next, as indicated in Step S8 of FIG. 3 and shown in FIG. 5G, a conductive paste for the base layer (underlayer) 7 is applied to the two end faces MA and MB of each element body 2 which has undergone the binder removal in Step S7 of FIG. 3 and to the end areas of the remaining four surfaces (top face 2T, the bottom face MY, the front face 2F and the rear face 2R) of the element body 2 which are in contact with the respective end faces MA and MB. Then, the conductive paste is dried. A dipping method may be used to apply the conductive paste for the base layer 7. The conductive paste for the base layer 7 includes a powder or filler of the metal used as the conductive material of the base layer 7. For example, when the metal used as the conductive material of the base layer 7 is Ni, the conductive paste for the base layer includes a powder or filler of Ni. Further, the conductive paste for the base layer includes, as a co-material, a ceramic component, which is the main component of the dielectric layers 4, for example. Particles of oxide ceramics mainly composed of barium titanate (0.01 µm to 4 µm in D50 particle diameter), for example, are mixed in the conductive paste for the base layer, as the co-material. Further, the conductive paste for the base layer includes a binder and a solvent.

Next, as indicated in Step S9 of FIG. 3 and shown in FIG. 5G, the element bodies 2, on which the conductive paste for the base layer is applied in Step S8 of FIG. 3, undergo the sintering process such that the inner electrode layers 3A and 3B are integrated with the dielectric layers 4 in each element body 2 and the base layers 7 are formed and integrated with the element body 2. The sintering of the element bodies 2 and the conductive pastes for the base layers is carried out in, for example, a sintering furnace in a temperature range from 1000 degrees C. to 1400 degrees C. for ten minutes to two hours. If a base metal such as Ni or Cu is used as the material of the internal electrode layers 3A and 3B, the sintering process may be carried out in the sintering furnace while the interior of the sintering furnace is kept to a reducing atmosphere in order to prevent the oxidation of the internal electrode layers 3A and 3B. In the process of forming the base layers 7, an oxidation process may be repeatedly performed in an $N_2$ atmosphere at a temperature of 600 degrees C. to 1000 degrees C.

Next, as indicated in Step S10 of FIG. 3 and shown in FIG. 5H, a plating process is carried out to form the plating layer 9 on each of the base layers 7. In the plating process, the Cu plating layer 9A, the Ni plating 9B and the Sn plating layer 9C are sequentially formed on the respective base layer 7. In this process, the element bodies 2 on which the base layers 7 are formed are placed in a barrel together with the plating solution, and the electricity is supplied to the barrel while rotating the barrel, so as to form the plating layers 9 on the respective element body 2.

Second Embodiment

Figure 6:
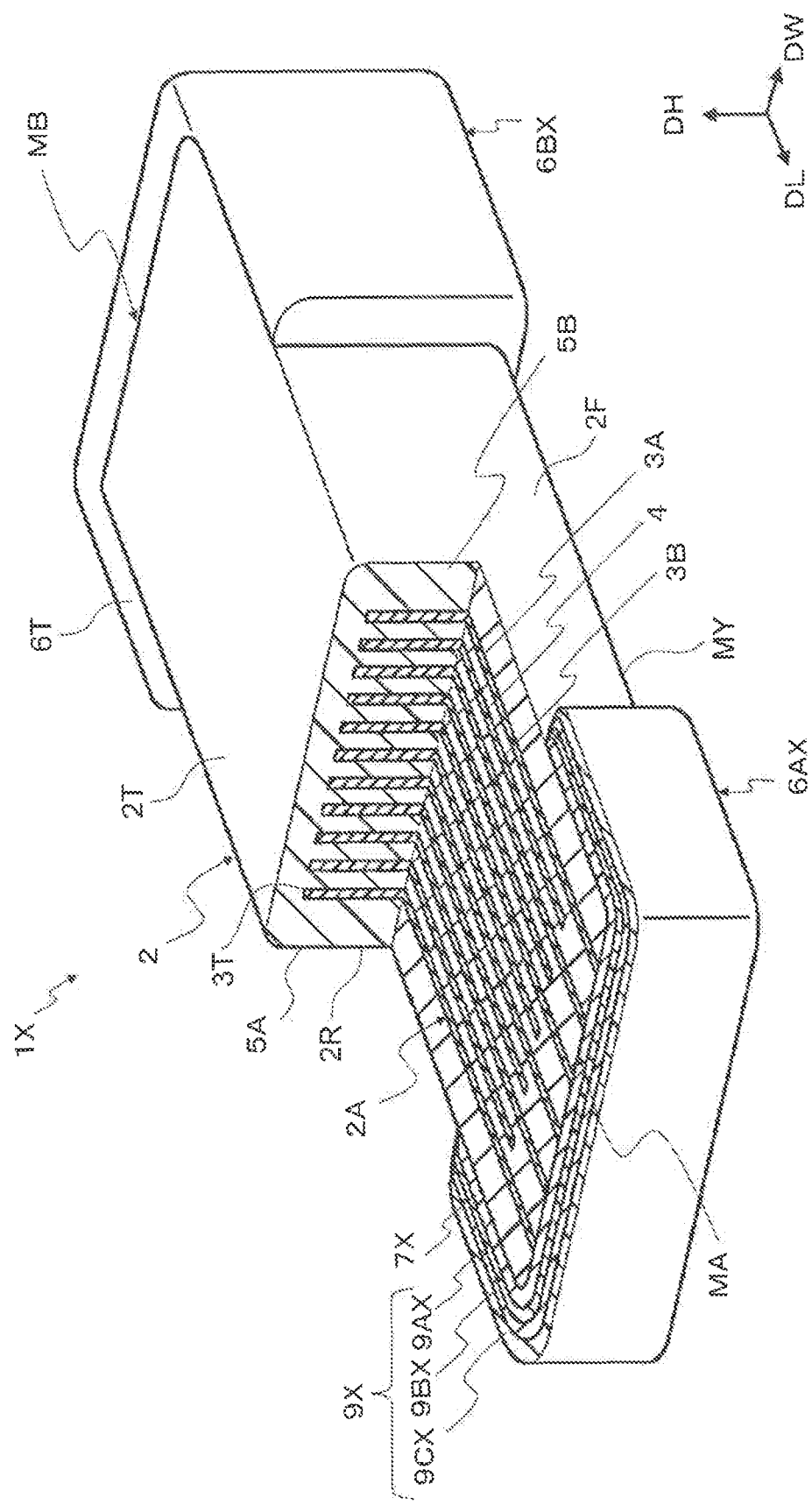
FIG. 6 is a perspective view showing an exemplary configuration of a multilayer ceramic capacitor according to a second embodiment of the present invention.

A second embodiment of the present invention will be described with reference to FIG. 6. FIG. 6 is a perspective view showing a configuration example of a multilayer ceramic capacitor 1X according to the second embodiment. Same or similar reference numerals are used to designate same or similar parts in the first and second embodiments.

As illustrated in FIG. 6, the multilayer ceramic capacitor 1X includes an element body 2 and two external electrodes 6AX and 6BX. The multilayer ceramic capacitor 1X can be configured in a similar manner to the multilayer ceramic capacitor 1A of FIG. 1 except the external electrodes 6AX and 6BX.

The external electrodes 6AX and 6BX are formed over the opposite end faces MA and MB of the element body 2 such that the external electrodes 6AX and 6BX are separated from each other in the longitudinal direction DL of the element body 2. Specifically, the left external electrode 6AX is formed on the left end face MA and extends on neighboring areas of the front face 2F, the rear face 2R and the bottom face MY of the element body 2, and the right external electrode 6BX is formed on the right end face MB and extends on neighboring areas of the front face 2F, the rear face 2R and the bottom face MY of the element body 2. The external electrodes 6AX and 6BX are not formed on the top face 2T of the element body 2. It should be noted that although the upper ends 6T of the external electrodes 6AX and 6BX are coplanar to the top face 2T of the element body 2 in FIG. 6, the upper ends 6T of the external electrodes 6AX and 6BX may be lower than the top face 2T of the element body 2 on the front face 2F and/or the rear face 2R of the element body 2.

Each of the external electrodes 6AX and 6BX includes a underlayer 7X formed on the element body 2, and a plating layer 9X formed on the underlayer 7X. The two underlayers 7X are formed over the opposite end faces MA and MB of the element body 2 such that the underlayers 7X are separated from each other in the longitudinal direction DL of the element body 2. Specifically, the left underlayer 7X is formed on the left end face MA and extends on neighboring areas of the front face 2F, the rear face 2R and the bottom face MY of the element body 2 such that the left underlayer 7X is connected to the inner electrode layers 3A, and the right underlayer 7X is formed on the right end face MB and extends on neighboring areas of the front face 2F, the rear face 2R and the bottom face MY of the element body 2 such that the right underlayer 7X is connected to the inner electrode layers 3B. The underlayers 7X are not formed on the top face 2T of the element body 2. Upper ends of the underlayers 7 may be coplanar to the top face 2T of the element body 2. Alternatively, the upper ends of the underlayers 7 may be lower than the top face 2T of the element body 2 on the front face 2F and/or the rear face 2R of the element body 2. The upper ends of the underlayers 7X are higher than the edges 3T of the inner electrode layers 3A and 3B on the front face 2F and the rear face 2R of the element body 2X.

A left plating layer 9X is formed on the left underlayer 7X of the external electrode 6AX and a right plating layer 9X is formed on the right underlayer 7X of the external electrode 6BX. The left plating layer 9X electrically conducts with the inner electrode layers 3A through the left underlayer 7X. The right plating layer 9X electrically conducts with the inner electrode layers 3B through the right underlayer 7X. Each of the plating layers 9X may have, for example, a three-layer structure. Specifically, the plating layer 9X may include a Cu plating layer 9AX formed on the underlayer 7X, an Ni plating layer 9BX formed on the Cu plating layer 9AX, and an Sn plating layer 9CX formed on the Ni plating layer 9BX.

The multilayer ceramic capacitor 1X that has the external electrodes 6AX and 6BX instead of the external electrodes 6A and 6B of FIG. 1 can reduce the height of the capacitor as compared with the multilayer ceramic capacitor 1A because the external electrodes 6AX and 6BX are not formed on the top face 2T of the element body 2.

Third Embodiment

Figure 7:
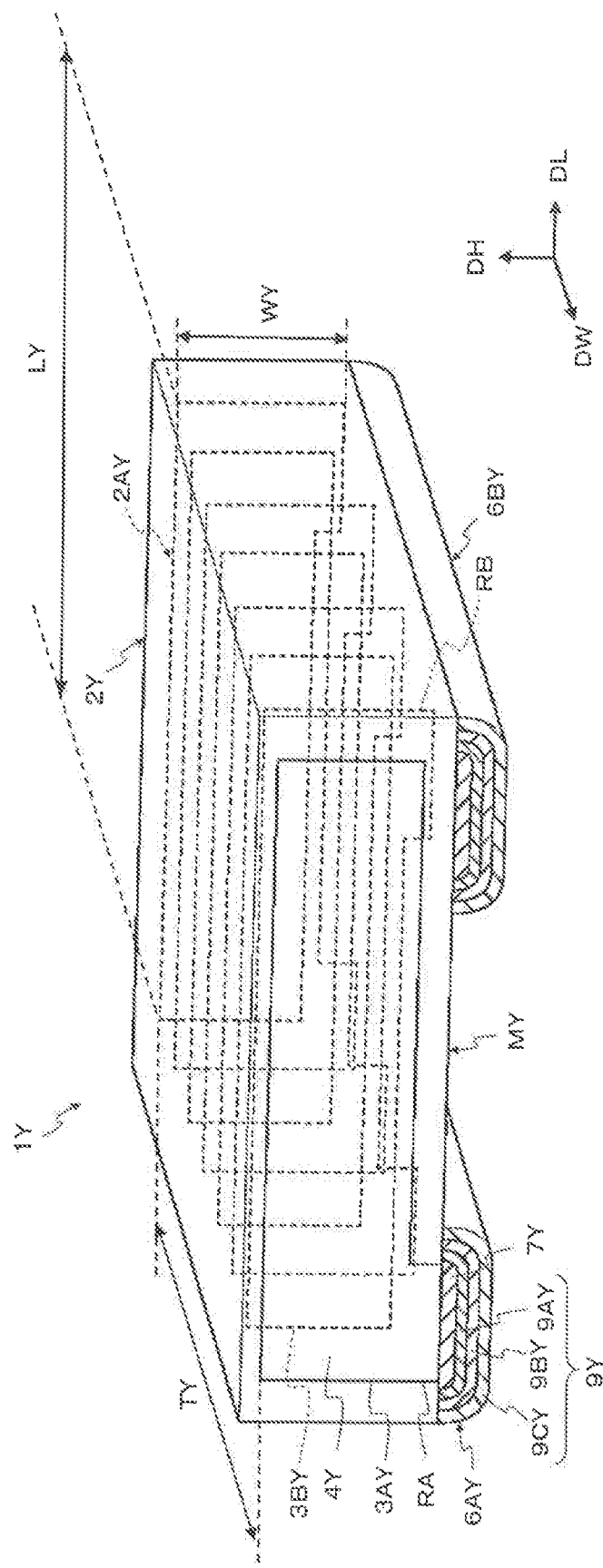
FIG. 7 is a perspective view showing an exemplary configuration of a multilayer ceramic capacitor according to a third embodiment of the present invention.

A third embodiment of the present invention will be described with reference to FIG. 7. FIG. 7 is a perspective view showing a configuration example of a multilayer ceramic capacitor 1Y according to the third embodiment. FIG. 7 illustrates the structure when the capacitor 1Y is cut along one of the inner electrode layers 3AY. Same or similar reference numerals are used to designate same or similar parts in the first and third embodiments.

As shown in FIG. 7, the multilayer ceramic capacitor 1Y includes an element body 2Y and two external electrodes 6AY and 6BY. The element body 2Y includes a laminate 2AY. The laminate 2AY includes inner electrode layers 3AY and 3BY and dielectric layers 4Y. The element body 2Y has six faces including a bottom face MY.

The inner electrode layers 3AY and 3BY are alternately arranged (laminated) in the width direction DW of the element body 2Y via the dielectric layers 4Y. In the element body 2Y, the respective inner electrode layers 3AY and 3BY stand upright in the height direction DH of the element body 2. The inner electrode layers 3AY are shifted to the left relative to the inner electrode layers 3BY in the length direction DL of the element body 2Y. If the inner electrode layers 3AY are looked at in the width direction DW of the element body 2Y, the inner electrode layers 3AY are aligned with each other (i.e., the inner electrode layers 3AY overlap each other). If the inner electrode layers 3BY are looked at in the width direction DW of the element body 2Y, the inner electrode layers 3BY are aligned with each other. The inner electrode layers 3AY and 3BY are only exposed in the bottom face MY of the element body 2Y.

In order to expose the inner electrode layers 3AY and 3BY from the bottom face MY of the element body 2Y, lead electrodes RA may be provided between the bottom face MY of the element body 2Y and the inner electrode layers 3AY and lead electrodes RB may be provided between the bottom face MY of the element body 2Y and the inner electrode layers 3BY. The respective lead electrode RA is connected to a lower left end portion of each of the inner electrode layers 3AY, and the respective lead electrode RB is connected to a lower right end portion of each of the inner electrode layers 3BY. Lower edges of the lead electrodes RA and RB are exposed in the bottom face MY of the element body 2Y. If the lead electrodes RA are looked at in the width direction DW of the element body 2Y, the lead electrodes RA are aligned with each other (i.e., the lead electrodes RA overlap each other). If the lead electrodes RB are looked at in the width direction DW of the element body 2Y, the lead electrodes RB are aligned with each other.

The stacking height TY of the laminate 2AY is larger than the width WY of the inner electrode 3AY, 3BY. The stacking direction of the laminate 2AY is the width direction DW of the element body 2Y. The width direction of the respective inner electrode layer 3AY, 3BY is the height direction DH of the element body 2Y. The length LY of the internal electrode layer 3AY, 3BY may be larger than the width WY of the internal electrode layer 3AY, 3BY. The length direction of the inner electrode layer 3AY, 3BY is the length direction DL of the element body 2Y. The length LY of the inner electrode layer 3AY, 3BY may be larger than the stacking height TY of the laminate 2A. The inner electrode layers 3AY and 3BY are made from the same material and have the same thickness. The material and thickness of the inner electrode layer 3AY, 3BY may be the same as the material and thickness of the inner electrode layer 3A, 3B of FIG. 1. The material and thickness of the dielectric layer 4Y may be the same as the material and thickness of the dielectric layer 4 of FIG. 1.

The external electrodes 6AY and 6BY are formed in parallel to each other on the bottom face MY of the element body 2Y. The external electrodes 6AY and 6BY are separated from each other in the length directions DL of the element body 2Y. Each of the external electrodes 6AY and 6BY includes an underlayer 7Y formed on the bottom face MY of the element body 2Y, and a plating layer 9Y formed on the underlayer 7Y. The underlayers 7Y are formed in parallel to each other on the bottom face MY of the element body 2Y. The underlayers 7Y are separated from each other in the length direction DL of the element body 2Y. The left underlayer 7Y is connected to the lead electrodes RA and the right underlayer 7Y is connected to the lead electrodes RB.

The left plating layer 9Y extends over the underlayer 7Y of the external electrode 6AY, and the right plating layer 9Y extends over the underlayer 7Y of the external electrode 6BY. The left plating layer 9Y electrically conducts with the inner electrode layers 3AY through the left underlayer 7Y, and the right plating layer 9Y electrically conducts with the inner electrode layers 3BY through the right underlayer 7Y. The plating layer 9Y may have, for example, a three-layer structure. Specifically, the plating layer 9Y may include a Cu plating layer 9AY formed on the underlayer 7Y, an Ni plating layer 9BY formed on the Cu plating layer 9AY, and an Sn plating layer 9CY formed on the Ni plating layer 9BY.

Because the multilayer ceramic capacitor 1Y has the external electrodes 6AY and 6BY instead of the external electrodes 6A and 6B of FIG. 1, it is possible to reduce the height of the capacitor as compared with the multilayer ceramic capacitor 1A of FIG. 1.

Fourth Embodiment

A fourth embodiment of the present invention will be described with reference to FIGS. 8A-8C. Same or similar reference numerals are used to designate same or similar parts in the first and fourth embodiments. FIG. 8A is similar to FIG. 2A and shows a cross-sectional view of a multilayer ceramic capacitor 1C according to the fourth embodiment, cut in the length direction DL of the multilayer ceramic capacitor 1C along one of first inner electrodes 3A of the capacitor 1C. FIG. 8B is similar to FIG. 2B and shows a cross-sectional view of the multilayer ceramic capacitor 1C, cut in the length direction DL along one of second inner electrodes 3B of the capacitor 1C. FIG. 8C is similar to FIG. 2C and shows a cross-sectional view of the multilayer ceramic capacitor 1C, cut in the width direction DW at the position of an element body 2C of the capacitor 1C.

In FIGS. 8A to 8C, the multilayer ceramic capacitor 1C includes the element body 2C instead of the element body 2 of the multilayer ceramic capacitor 1A of FIG. 2A to FIG. 2C. The element body 2C includes a laminate 2AC, two covering layers 5A and 5B, and margin layers 8A and 8B. The laminate 2AC includes the inner electrode layers 3A and 3B and dielectric layers 4.

The covering layers 5A and 5B sandwich the laminate 2AC in the stacking direction DW. The margin layers 8A and 8B sandwich the laminate 2AC in the width direction DH of the inner electrode layer 3A, 3B. Each of the inner electrode layers 3A has an edge E3 and an opposite edge E4. Each of the inner electrode layers 3B has an edge E5 and an opposite edge E6. The margin layer 8A may contact the edges E3 of the inner electrode layers 3A and the edges E5 of the inner electrode layers 3B. The margin layer 8B contacts the edges E4 of the inner electrode layers 3A and the edges E6 of the inner electrode layers 3B. The stacking direction of the laminate 2AC is the width direction DW of the element body 2C. The width direction of the inner electrode layer 3A, 3B is the height direction DH of the element body 2C.

The edges E3, E4, E5 and E6 of the inner electrode layers 3A and 3B are exposed from the laminate 2AC in the width direction DH of the inner electrode layer 3A, 3B. The laminate 2AC may be configured in a similar manner to the laminate 2A of FIGS. 2A-2C except that the inner electrode layers 3A and 3B are exposed from the dielectric layers 4 in the width direction of the inner electrode layers 3A and 3B. It should be noted that the inner electrode layers 3A and 3B in the multilayer ceramic capacitor 1C may be formed by applying a conductive paste for the inner electrode in a film form and sintering the film of the applied conductive paste. In this process for forming the inner electrode layers 3A and 3B, a process for preparing the internal electrode patterns 23' shown in FIG. 4C may be used, and the internal electrode patterns 23' do not need to be separated for each element body 2C in the width direction DH of the internal electrode. Therefore, it is possible to increase the width WA of each of the internal electrode patterns 23'. This prevents each of the internal electrode patterns 23' from having a dome shape, unlike the internal electrode patterns 23' shown in FIG. 4C. Consequently, even if the inner electrode layers 3A and 3B are formed by sintering the applied film of the conductive paste for the inner electrode, the thickness T1 of the inner electrode layer 3A, 3B at the end portions E1 of the inner electrode layer 3A, 3B can be within the range from 85% to 115% of the thickness of the central portion of the inner electrode layer 3A, 3B.

When cutting the laminate block 25 in the process of FIG. 5E to prepare the element body 2 for the multilayer ceramic capacitor 1A, the cutting lines 27 extend those portions which do not have the applied conductive paste for the inner electrode. In the multilayer ceramic capacitor 1C, however, the cutting lines extend those portions which have the applied conductive paste for the inner electrode. Therefore, the internal electrode layers 3A and 3B are exposed from the dielectric layers 4 at the edges E4-E6 thereof. After cutting the laminate block 25, the margin layers 8A and 8B are formed to sandwich the laminate 2AC in the width direction DH of the inner electrode layer 3A, 3B. Base layers 7 are formed on the element body 2C, on which the margin layers 8A and 8B are formed, in the same process as in FIG. 5G. Plating layers 9 are formed over the base layers 7 in the same process as in FIG. 5H.

Fifth Embodiment

A fifth embodiment of the present invention will be described with reference to FIG. 9. FIG. 9 is a cross-sectional view showing a configuration example of a substrate arrangement 40 that includes the substrate 41 and the multilayer ceramic capacitor 1A mounted on the substrate 41. In FIG. 9, the substrate arrangement 40 is mounted on an upper mounting substrate 45. The upper mounting substrate 45 may be referred to as a motherboard. The lower mounting substrate 41 has an outer face 41a and an inner face 41b. The inner face 41b may be referred to as a back face 41b. The back face 41b may be referred to as a mounting surface. The upper mounting substrate 45 has an outer face 45a and an inner face 45b. The inner face 45b may be referred to as a back face 45b.

As illustrated in FIG. 9, four land electrodes 42A, 42B, 44A and 44B are formed on the back face 41b of the mounting substrate 41. The multilayer ceramic capacitor 1A is connected to the land electrodes 42A and 42B through the solder layers 43A and 43B, respectively, which are attached to the plating layers 9 of the external electrodes 6A and 6B. The multilayer ceramic capacitor 1A is disposed on the lower substrate 41 such that the width direction of the respective internal electrode layer 3A, 3B coincides with the height direction DH of the element body 2. Solder balls 47A and 47B are formed on the land electrodes 44A and 44B disposed on the back face 41b of the substrate 41, respectively.

It should be noted that although not illustrated in FIG. 9, one or more semiconductor chips are mounted on the outer face 41a of the mounting substrate 41. The semiconductor chip(s) may include a microprocessor, a semiconductor memory, an FPGA (Field-Programmable Gate Array) and/or an ASIC (Application Specific Integrated Circuit).

Land electrodes 46A and 46B are formed on the back face 45b of the upper mounting substrate 45. The upper mounting substrate 45 is connected to the lower mounting substrate 41 via the solder balls 47A and 47B. The substrate arrangement 40 that includes the mounting substrate 41 and the capacitor 1A is mounted on the motherboard 45.

The mounting substrates 41 and 45 are spaced from each other in the height direction DH of the element body 2 by the solder balls 47A and 47B. A resin 48 is provided between the mounting substrates 41 and 45 to encapsulate (or seal) the multilayer ceramic capacitor 1A. The resin 48 is, for example, an epoxy resin. The resin 48 may be injected and cured between the mounting boards 41 and 45 after the mounting boards 41 and 45 are connected to each other by the solder balls 47A and 47B.

Because the multilayer ceramic capacitor 1A is mounted on the back face 41b of the mounting substrate 41, the multilayer ceramic capacitor 1A is placed on the opposite face of the mounting substrate 41 when looked at from the semiconductor chip(s) which is mounted on the outer face 41a of the mounting substrate 41. Thus, it is possible to mount the multilayer ceramic capacitor 1A in close proximity to the semiconductor chip(s) mounted on the outer face 41a of the mounting substrate 41, thereby effectively eliminating the noise added to the semiconductor chip(s).

The height TA of the laminate 2A in the stacking direction DW is greater than the width WA of the respective inner electrode layer 3A, 3B, and the multilayer ceramic capacitor 1A is mounted on the substrate 41 such that the width direction of the respective inner electrode layer 3A, 3B coincides with the height direction DH of the element body 2. Thus, it is possible for the multilayer ceramic capacitor 1A to have a reduced height H2 while suppressing a decrease in the capacitance of the capacitor 1A. Therefore, it is possible to place the multilayer ceramic capacitor 1A in the gap between the two substrates 41 and 45 connected to each other via the solder balls 47A and 47B. It is also possible to place the multilayer ceramic capacitor 1A on the inner face 41b of the mounting substrate 41 whereas the semiconductor chip(s) are placed on the opposite face (outer face) 41a of the mounting substrate 41. This contributes to effective elimination of the noise applied to the semiconductor chip(s). It should be noted that although a combination of the mounting substrate 41 and the capacitor 1A is referred to as a substrate arrangement in the foregoing, a combination of the two mounting substrates 41 and 45 and the capacitor 1A may be referred to as a substrate arrangement.

EXAMPLES

FIG. 10 shows a table 80 of the comparison between actual examples of the present invention (multilayer ceramic capacitor 1A) and comparative examples with regard to various dimensions and values, including the height and capacitance of the multilayer ceramic capacitor. In FIG. 10, "Size L" represents the length of the capacitor, "Size W" represents the width of the capacitor and "Size T" represents the thickness of the capacitor. FIG. 10 shows the evaluation results (e.g., capacitance and rupture strength) when the outer size of the multilayer ceramic capacitor 1A of FIG. 1 was 1005. It should be noted that similar results to those shown in FIG. 10 were obtained when the outer size of the capacitor was 0603 and 0402. Examples 1 to 3 show the values when the element body 2' of FIG. 2D was used in the multilayer ceramic capacitor 1A. Examples 4 to 6 show the values when the element body 2 of FIG. 2C was used in the multilayer ceramic capacitor 1A. Comparative Examples 1 to 3 show the values when the inner electrode layers 3A and 3B were laminated in parallel to the mounting substrate (conventional manufacturing method).

As understood from the table 80 of FIG. 10, if the conventional manufacturing method was used to prepare the multilayer ceramic capacitors (Comparative Examples 1 to 3) and the number of stacked inner electrode layers 3A and 3B was reduced in order to reduce the height of the multilayer ceramic capacitor, the capacitance density of the capacitor greatly dropped. In Examples 1 to 3, each of the inner electrode layers 3A' and 3B' became a dome shape and a difference in the thickness of the respective inner electrode layer 3A', 3B' between the center portion and the end portion E1 became large. Thus, the capacitance density of the capacitor dropped. In Examples 4 to 6, there was no need to reduce the number of stacked inner electrode layers 3A and 3B for the purpose of reducing the height H2 of the capacitor 1A. In addition, the difference in the thickness of the respective inner electrode layer 3A and 3B between the central portion and the end portion E1 was small. In Examples 4 to 6, therefore, it was possible to maintain the capacitance density. In Examples 4 to 6, since the inner electrode layers 3A and 3B stand upright relative to the mounting surface (the mounting substrate 41), the rupture strength of the multilayer ceramic capacitor 1A against a load exerted at the time of mounting of the multilayer ceramic capacitor 1A on the substrate 41 can also be enhanced.

It will be apparent to those skilled in the art that various modifications and variations can be made in the present invention without departing from the spirit or scope of the invention. Thus, it is intended that the present invention encompasses modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multilayer ceramic capacitor comprising:
an element body that includes a laminate, the laminate having a plurality of inner electrode layers stacked via dielectric layers, a height of the laminate in a stacking direction of the inner electrode layers being greater than a width of each of the inner electrode layers; and
a pair of external electrodes formed on the element body such that one of the pair of the external electrodes is connected to every other ones of the plurality of inner electrode layers and the other of the pair of the external electrodes is connected to the remaining every other ones of the plurality of inner electrode layers,
wherein the element body has a plurality of faces including a pair of opposing end faces and four faces that are perpendicular to the end faces, the four faces including a top face, a bottom face, a front face, and a rear face, the plurality of inner electrode layers include first inner electrode layers and second inner electrode layers such that the first inner electrode layers are exposed at one of the end faces and the second inner electrode layers are exposed at the other of the end faces, one of the pair of external electrodes is formed on the one of the end faces and extends therefrom onto neighboring areas of the bottom face, the front face, and the rear face and only the bottom face, the front face, and the rear face among the four faces of the element body, and the other of the pair of external electrodes is formed on the other of the end faces and extends therefrom onto neighboring areas of the bottom face, the front face, and the rear face and only the bottom face, the front face, and the rear face among the four faces of the element body, wherein each of the external electrodes has front and rear portions that cover the corresponding neighboring areas of the front face and the rear face of the element body, and each of the front and rear portions has an upper edge that is lower than the top face of the element body, and wherein each of the external electrodes has an end-covering portion that covers the corresponding end face of the element body, and the end-covering portion has an upper edge that has a height that is equal to that of the top face of the element body.

2. The multilayer ceramic capacitor according to claim 1, wherein in each of the inner electrode layers, a length of the inner electrode layer is greater than the width of the inner electrode layer.

3. The multilayer ceramic capacitor according to claim 2, wherein in each of the inner electrode layers, the length of the inner electrode layer is greater than twice the width of the inner electrode layer.

4. The multilayer ceramic capacitor according to claim 1, wherein the length of each of the inner electrode layers is greater than the height of the laminate.

5. The multilayer ceramic capacitor according to claim 1, wherein in each of the inner electrode layers, a thickness of a width-direction end portion of the inner electrode layer is in a range from 85% to 115% of a thickness of a central portion of the inner electrode layer.

6. The multilayer ceramic capacitor according to claim 1, wherein an average value of a thickness of each of the inner electrode layers is 1 μm or less, and the thickness of each of the inner electrode layers is 0.05 μm or more.

7. The multilayer ceramic capacitor according to claim 6, wherein the average value of the thickness of each of the inner electrode layers is 0.5 μm or less.

8. The multilayer ceramic capacitor according to claim 1, wherein the width of each of the inner electrode layers is between 30 μm and 500 μm.

9. The multilayer ceramic capacitor according to claim 8, wherein the width of each of the inner electrode layers is between 30 μm and 200 μm.

10. The multilayer ceramic capacitor according to claim 1, wherein each of the inner electrode layers is a deposited film.

11. The multilayer ceramic capacitor of claim 1, wherein each of the dielectric layers is a sintered body of a coating film containing a ceramic component.

12. A device comprising:
a mounting substrate; and
the multilayer ceramic capacitor as set forth in claim 1, mounted on the mounting substrate via at least one solder layer,
wherein the plurality of inner electrode layers of the multilayer ceramic capacitor are parallel to a direction perpendicular to the mounting substrate and are stacked in a horizontal direction along the mounting substrate.

13. The multilayer ceramic capacitor of claim 1, wherein each of the external electrodes includes an underlayer formed on the element body and a plating layer formed on the underlayer, wherein the underlayer has front and rear portions that cover portions of the front face and the rear face of the element body, and each of the front and rear portions of the underlayer has an upper edge that is higher than upper edges of the inner electrodes.

14. The multilayer ceramic capacitor of claim 13, wherein the inner electrodes have a uniform height.

15. A device comprising:
a mounting substrate; and
the multilayer ceramic capacitor as set forth in claim 14, mounted on the mounting substrate via at least one solder layer,
wherein the plurality of inner electrode layers of the multilayer ceramic capacitor are parallel to a direction perpendicular to the mounting substrate and are stacked in a direction perpendicular to the mounting substrate.

16. A device comprising:
a mounting substrate; and
the multilayer ceramic capacitor as set forth in claim 13, mounted on the mounting substrate via at least one solder layer,
wherein the plurality of inner electrode layers of the multilayer ceramic capacitor are parallel to a direction perpendicular to the mounting substrate and are stacked in a direction perpendicular to the mounting substrate.

* * * * *